UNITED STATES PATENT OFFICE.

LOUIS B. TRUSLOW, OF THOMASTON, NEW YORK.

VEHICLE TOE-REST.

SPECIFICATION forming part of Letters Patent No. 696,661, dated April 1, 1902.

Application filed February 25, 1902. Serial No. 95,528. (No model.)

*To all whom it may concern:*

Be it known that I, LOUIS B. TRUSLOW, a citizen of the United States, residing at Thomaston, in the county of Nassau and State of New York, have invented certain new and useful Improvements in Vehicle Toe-Rests, of which the following is a specification.

The invention to be hereinafter described relates to toe-rests for carriages, wagons, and the like against which the driver braces his feet to secure an effective purchase. It is well known that the usual vehicle is provided with a toe-rest permanently secured to the inside bottom thereof in close proximity to the dashboard and at a fixed distance from the seat, so that the average driver may while properly retaining his seat rest his or her toes against the toe-rest; but in case a driver under the average size is employed he or she fails to secure the advantages of the toe-rest, since if he or she retains his or her proper position in the driver's seat his or her feet will not reach the toe-rest, or if the exigencies of driving render it necessary that he or she secure the purchase afforded by the toe-rest then he or she must rest his or her body on the forward edge of the seat in an uncomfortable and unsightly position. Likewise it is desirable in the same vehicle to use the ordinary seat at times and at other times to employ a higher seat to give the driver a commanding view, in which latter case the driver's feet, which with the ordinary seat were braced against the toe-rest, will not reach the toe-rest, and he or she is called upon to secure an uncertain purchase or brace directly from the floor of the vehicle. It is the object of my invention to meet these objections and to provide an auxiliary toe-rest that may be readily attached to and detached from the ordinary toe-rest now commonly employed and which when in position may be adjusted to suit the size of the driver or the height of the seat, so that a brace or purchase for the driver's feet is available to enable the driver to properly retain his or her seat under all ordinary conditions and yet secure the advantages of a toe-rest.

In the drawings, Figure 1 is a perspective view of my improved auxiliary toe-rest, showing by dotted lines its position and relation with respect to the ordinary toe-rest; and Fig. 2 is a longitudinal section thereof through the adjustable members of the auxiliary toe-rest.

In the drawings, A indicates by dotted lines the usual or any desired form of front to a vehicle, as the dashboard, and B the usual or desirable form of permanent toe-rest now commonly employed and secured in position in proximity to the dashboard A by fastening $b$. The top bar B' of the toe-rest is not usually circular in cross-section, but, as shown in Fig. 2, is flattened on one side to form a more extensive bearing for the toes of the driver. The permanent toe-rest may be varied in construction as desired, since it forms no part of my present invention except in so far as it affords a means for detachably connecting my auxiliary toe-rest in position.

The auxiliary toe-rest in the embodiment of my invention shown comprises side or supporting members C C of any desired number, each consisting of two sections D D', adjustably secured together, the sections D being preferably provided with a longitudinal slot $d$, through which a pin $d'$, secured to the section D', passes, said pin being provided with a screw-thread $d^2$, which is engaged by a set nut E, whereby the two sections may be secured or clamped together in any desired position of adjustment of the sections with relation to each other, as will be obvious, the face of the set nut E taking against the under side of the section D. By disposing the set nuts E beneath the section D all liability of injury thereto or catching thereof in the clothing of occupants of the vehicle is avoided. In order to guide the section D' in alinement with the section D during sliding movement thereof, I preferably provide the section D at its outer end with a guide $d^3$, through which the section D' passes, and I also preferably dispose the pin $d'$ near the inner end of the upper section D', the slot $d$ being formed only slightly larger than the diameter of the pin, so that in the movement of the sections D and D' upon each other they are accurately guided and cannot bind or become jammed. The upper section D' is continued in length beyond the guide $d^3$ and has a downward end $d^4$, provided with a supporting-foot $d^5$ to rest upon the floor of the vehicle. Near its upper portion the end $d^4$ is bent or turned, as at $d^6$, to provide a securing-seat for the toe-rest bar F, the surface of which is thus directed upward and to the rear of the vehicle to afford the most advantageous position for receiving the toes of the driver and bracing the same.

The lower sections D of the auxiliary toe-rest are provided at their ends with means for detachably connecting the auxiliary toe-rest to the permanent toe-rest B, said means in the present embodiment of my invention comprising the socketed ends G, the walls of which are preferably bent into rounded form, as shown, leaving a space between the ends $g\ g$ of the walls for the passage of the bar B' of the permanent toe-rest. It will be noted that the distance between the ends $g\ g$ of the walls is less than the diameter of the socket G and also less than the greatest dimensions of the bar B' of the permanent toe-rest, the parts being shaped and disposed as shown, so that when the auxiliary toe-rest is in position for use, as indicated in the drawings, it cannot become detached from the permanent toe-rest. To detach the auxiliary toe-rest, however, it is only necessary to turn the free end thereof upward until the smallest dimension or diameter of the permanent toe-rest bar B' comes in position opposite the opening between the ends $g\ g$ of the socket G, when the auxiliary toe-rest can be removed.

In order to strengthen and make more rigid the frame of the auxiliary toe-rest, I have provided a cross-bar H, which is rigidly secured to the lower sections D D near their socketed ends, said cross-bar being preferably disposed beneath the said lower sections.

While I have described the above particular construction as the preferred embodiment of my invention, it is to be understood that the details of structure may be varied without departing from the spirit of my invention, which contemplates an auxiliary toe-rest that may be readily attached to and detached from the ordinary permanent toe-rest now commonly employed without in any manner altering or defacing the said commonly-employed construction and which when in use will be securely held in place and yet be readily removable when desired without the use of tools or other devices and, further, that may be adjustable to suit the varying circumstances of use either while secured in position or while detached.

It will be noted that the auxiliary toe-rest which forms the subject of my invention does not require the provision of any special means for securing it in position for use, but may be readily and quickly attached or detached from the ordinary toe-rest now commonly employed, and while in position for use it has a firm bearing by an elongated foot $d^5$ upon the floor of the vehicle and may be adjusted readily to suit any particular use by simply loosening the set nut E, sliding the members upon each other, and then setting up the said nut. When not required for use, it is simply detached from the permanent toe-bar and leaves no unsightly evidence—such as screw-holes, pins, or projections—in any part of the vehicle to indicate that it has ever been employed.

Having thus described my invention, what I claim, and desire to secure by Letters Patent, is—

1. An auxiliary toe-rest for vehicles, comprising supporting members each member consisting of adjustable sections slidable one upon the other, a toe-rest bar carried by one of said sections, means for securing the said sections in adjusted position and means for detachably securing the auxiliary toe-rest to the permanent toe-rest.

2. An auxiliary toe-rest for vehicles, comprising supporting members, each member consisting of adjustable sections slidable one upon the other, one of said sections being provided with a supporting-foot adapted to rest upon the floor of the vehicle, a toe-rest bar carried by one of said sections, means for securing the said sections in adjusted position, provisions for detachably connecting the auxiliary toe-rest to the permanent toe-rest of a vehicle.

3. An auxiliary toe-rest for vehicles comprising supporting members and a toe-rest bar carried by said supporting members, said supporting members being provided at one end with supporting-feet to rest upon the floor of the vehicle and means carried by the opposite ends of said supporting members for ready and detachable engagement with the permanent toe-rest.

4. An auxiliary toe-rest for vehicles comprising supporting members, a toe-rest bar carried by said supporting members, and means for detachably securing the auxiliary toe-rest to the permanent toe-rest, said means comprising socketed ends carried by the supporting members, the walls of said socketed ends being provided with an opening to permit the passage of the permanent toe-rest into the socketed ends when the free end of said toe-rest is elevated, and to prevent the disengagement of the socketed ends from the permanent toe-rest when the auxiliary toe-rest is in position for use.

5. An auxiliary toe-rest for vehicles comprising supporting members each provided at one end with a foot adapted to rest upon the floor of the vehicle, a toe-rest bar carried by said supporting members, and means for detachably securing the auxiliary toe-rest to the permanent toe-rest, said means comprising socketed ends carried by the supporting members, the walls of said socketed ends being provided with an opening to permit the passage of the permanent toe-rest into the socketed ends when the free end of said toe-rest is elevated and to prevent disengagement of the socketed ends from the permanent toe-rest when the auxiliary toe-rest is in position for use.

6. A toe-rest comprising supporting members, each of said members being formed of sections slidable one upon the other, one of said sections being provided with an elongated slot, a pin carried by the other of said sections and engaging said slot, a set nut engaging said pin, a toe-rest bar carried by one of said sections, and means carried by the other of said sections for detachable connection of the auxiliary toe-rest to the usual permanent toe-rest.

7. A toe-rest comprising supporting members each of said members being formed of sections adjustable with relation to each other, a slot-and-pin connection between said sections, supporting-feet carried by one of said sections, the other of said sections being provided with a socketed end for detachable connection with the permanent toe-rest of a vehicle, said socketed end having a passageway leading thereinto whereby the auxiliary toe-rest may be engaged with and disengaged from the permanent toe-rest when raised from position of use, and locked to said permanent toe-rest when in position of use.

LOUIS B. TRUSLOW.

In presence of—
G. SMITH STANTON,
JOHN B. GILLIAR.